(12) United States Patent
Langdon et al.

(10) Patent No.: US 6,343,984 B1
(45) Date of Patent: Feb. 5, 2002

(54) LAMINAR FLOW DUCT COOLING SYSTEM

(75) Inventors: Daryl J. Langdon; Robert Robbins, both of San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/203,220

(22) Filed: Nov. 30, 1998

(51) Int. Cl.[7] .................................................. H05K 7/20
(52) U.S. Cl. ...................................... 454/184; 361/695
(58) Field of Search ....................... 454/184; 361/695; 165/80.3, 122

(56) References Cited

U.S. PATENT DOCUMENTS

| 3,813,529 A | 5/1974 | Bartlett |
| 3,893,024 A | 7/1975 | Reins et al. |
| 4,075,691 A | 2/1978 | Davis et al. |
| 4,075,704 A | 2/1978 | O'Leary |
| 4,156,907 A | 5/1979 | Rawlings |
| 4,333,144 A | 6/1982 | Whiteside |
| 4,351,023 A | 9/1982 | Richer |
| 4,377,843 A | 3/1983 | Garringer |
| 4,399,503 A | 8/1983 | Hawley |
| 4,456,957 A | 6/1984 | Schieltz |
| 4,459,664 A | 7/1984 | Pottier |
| 4,488,231 A | 12/1984 | Yu et al. |
| 4,494,188 A | 1/1985 | Nakane |
| 4,527,232 A | 7/1985 | Bechtolsheim |
| 4,550,368 A | 10/1985 | Bechtolsheim |
| 4,589,067 A | 5/1986 | Porter et al. |
| 4,620,292 A | 10/1986 | Hagiwara |
| 4,685,125 A | 8/1987 | Zave |
| 4,710,868 A | 12/1987 | Cocke et al. |
| 4,719,569 A | 1/1988 | Ludemann |
| 4,742,447 A | 5/1988 | Duvall et al. |
| 4,742,450 A | 5/1988 | Duvall et al. |
| 4,761,737 A | 8/1988 | Duvall et al. |

(List continued on next page.)

FOREIGN PATENT DOCUMENTS

| EP | 0306244 A2 | 3/1989 |
| EP | 0308056 A2 | 3/1989 |
| EP | 0410630 A | 1/1991 |

(List continued on next page.)

OTHER PUBLICATIONS

"Mapping the VM text files to the AIX text files", IBM Technical Disclosure Bulletin., vol. 33, No. 2, Jul. 1990 , p. 341 XP000123641, IBM Corp. New York., US ISSN: 0018–8689.

"Migrated Data Backup Utility", IBM Technical Disclosure Bulletin., vol. 37, No. 06B, Jun. 1994 , pp. 505–507, XP000456079, IBM Corp. New York., US ISSN: 0018–8689.

R. Reichel: "Inside Windows NT Security: Part 1" Windows/DOS Developers' Journal, vol. 4, No. 4, Apr. 1993, pp. 6–19, XP002107445, Lawrence, Ks, USA.

(List continued on next page.)

*Primary Examiner*—Harold Joyce
(74) *Attorney, Agent, or Firm*—Swernofsky Law Group

(57) ABSTRACT

The invention provides a redundant cooling system with abatement of noise from cooling fans used primarily in computer equipment and other boxes housing electronic equipment. Typically either the computer system or box housing electronic components has two parallel side panels, a front panel, and a back panel upon which cooling fans are mounted to draw air across various electronic components and through the box for heat dissipation. The cooling system includes an airflow grille attached to one end of a laminar flow duct and two adjacent cooling fans mounted to the other end of a laminar flow duct which includes a Venturi opening on the top panel of the laminar flow duct to facilitate laminar flow through the laminar flow duct at a distance before the cooling fans and at a distance after the cooling fans.

3 Claims, 2 Drawing Sheets

U.S. PATENT DOCUMENTS

| | | | |
|---|---|---|---|
| 4,761,785 A | 8/1988 | Clark et al. | |
| 4,766,534 A | 8/1988 | DeBenedicts | |
| 4,780,821 A | 10/1988 | Crossley | |
| 4,783,730 A | 11/1988 | Fischer | |
| 4,803,621 A | 2/1989 | Kelly | |
| 4,819,159 A | 4/1989 | Shipley et al. | |
| 4,825,354 A | 4/1989 | Agrawal et al. | 364/200 |
| 4,827,411 A | 5/1989 | Arrowood | |
| 4,845,609 A | 7/1989 | Lighthart et al. | |
| 4,875,159 A | 10/1989 | Cary et al. | |
| 4,887,204 A | 12/1989 | Johnson et al. | |
| 4,897,781 A | 1/1990 | Chang et al. | |
| 4,914,583 A | 4/1990 | Weisshaar | |
| 4,937,763 A | 6/1990 | Mott | |
| 4,965,772 A | 10/1990 | Daniel et al. | |
| 4,969,118 A | 11/1990 | Montoye et al. | |
| 4,984,272 A | 1/1991 | McIlroy et al. | 380/25 |
| 5,001,628 A | 3/1991 | Johnson et al. | |
| 5,001,712 A | 3/1991 | Slpett et al. | |
| 5,008,786 A | 4/1991 | Thatte | |
| 5,018,144 A | 5/1991 | Corr et al. | |
| 5,043,871 A | 8/1991 | Nishigaki | |
| 5,043,876 A | 8/1991 | Terry | |
| 5,049,873 A | 9/1991 | Robins et al. | |
| 5,067,099 A | 11/1991 | McCown et al. | |
| 5,107,500 A | 4/1992 | Wakamoto | |
| 5,113,442 A | 5/1992 | Moir | 380/25 |
| 5,134,619 A | 7/1992 | Henson et al. | |
| 5,144,659 A | 9/1992 | Jones | 308/4 |
| 5,146,588 A | 9/1992 | Crater et al. | |
| 5,155,835 A | 10/1992 | Belsan | |
| 5,163,131 A | 11/1992 | Row et al. | |
| 5,163,148 A | 11/1992 | Walls | |
| 5,182,805 A | 1/1993 | Campbell | |
| 5,195,100 A | 3/1993 | Katz et al. | |
| 5,202,983 A | 4/1993 | Orita et al. | 395/600 |
| 5,208,813 A | 5/1993 | Stallmo | |
| 5,218,695 A | 6/1993 | Noveck et al. | |
| 5,218,696 A | 6/1993 | Baird et al. | |
| 5,222,217 A | 6/1993 | Blount et al. | 395/325 |
| 5,235,601 A | 8/1993 | Stallmo et al. | |
| 5,251,308 A | 10/1993 | Frank | |
| 5,255,270 A | 10/1993 | Yanai et al. | |
| 5,261,044 A | 11/1993 | Dev et al. | |
| 5,261,051 A | 11/1993 | Masden et al. | |
| 5,274,799 A | 12/1993 | Brant et al. | |
| 5,274,807 A | 12/1993 | Hoshen et al. | |
| 5,276,840 A | 1/1994 | Yu | |
| 5,276,867 A | 1/1994 | Kenley et al. | |
| 5,283,830 A | 2/1994 | Hinsley et al. | 380/25 |
| 5,297,265 A | 3/1994 | Frank et al. | |
| 5,305,326 A | 4/1994 | Solomon et al. | |
| 5,313,626 A | 5/1994 | Jones et al. | |
| 5,313,646 A | 5/1994 | Hendricks | |
| 5,313,647 A | 5/1994 | Kaufman | |
| 5,315,602 A | 5/1994 | Noya et al. | |
| 5,317,731 A | 5/1994 | Dias et al. | |
| 5,333,305 A | 7/1994 | Neufeld | |
| 5,335,235 A | 8/1994 | Arnott et al. | |
| 5,355,453 A | 10/1994 | Row et al. | |
| 5,357,509 A | 10/1994 | Ohizumi | |
| 5,357,612 A | 10/1994 | Alaiwan | |
| 5,377,196 A | 12/1994 | Godlew et al. | |
| 5,379,417 A | 1/1995 | Lui et al. | |
| 5,430,729 A | 7/1995 | Rahnema | |
| 5,454,095 A | 9/1995 | Kraemer et al. | |
| 5,463,642 A | 10/1995 | Gibbs et al. | |
| 5,485,455 A | 1/1996 | Dobbins et al. | |
| 5,490,248 A | 2/1996 | Dan et al. | |
| 5,497,343 A | 3/1996 | Rarick | |
| 5,502,836 A | 3/1996 | Hale et al. | |
| 5,504,883 A | 4/1996 | Coverston et al. | |
| 5,519,844 A | 5/1996 | Stallmo | |
| 5,535,375 A | 7/1996 | Eshel et al. | |
| 5,555,244 A | 9/1996 | Gupta et al. | |
| 5,572,711 A | 11/1996 | Hirsch et al. | 395/500 |
| 5,574,843 A | 11/1996 | Gerlach, Jr. | |
| 5,604,862 A | 2/1997 | Midgely et al. | 395/182.04 |
| 5,617,568 A | 4/1997 | Ault et al. | 395/612 |
| 5,621,663 A | 4/1997 | Skagerling | |
| 5,627,842 A | 5/1997 | Brown et al. | |
| 5,628,005 A | 5/1997 | Hurvig | |
| 5,630,060 A | 5/1997 | Tang et al. | |
| 5,634,010 A | 5/1997 | Ciscon et al. | |
| 5,642,501 A | 6/1997 | Doshi et al. | |
| 5,644,718 A | 7/1997 | Belove et al. | |
| 5,649,152 A | 7/1997 | Ohran et al. | 395/441 |
| 5,649,196 A | 7/1997 | Woodhill et al. | 395/620 |
| 5,666,353 A | 9/1997 | Klausmeiser | |
| 5,668,958 A | 9/1997 | Bendert et al. | 710/128 |
| 5,673,265 A | 9/1997 | Gupta et al. | |
| 5,675,726 A | 10/1997 | Hohenstein et al. | |
| 5,675,782 A | 10/1997 | Montague et al. | 395/609 |
| 5,678,006 A | 10/1997 | Valizadeh | |
| 5,678,007 A | 10/1997 | Hurvig | |
| 5,689,701 A | 11/1997 | Ault et al. | 395/610 |
| 5,694,163 A | 12/1997 | Harrison | |
| 5,696,486 A | 12/1997 | Poliquin et al. | |
| 5,720,029 A | 2/1998 | Kern et al. | |
| 5,721,916 A | 2/1998 | Pardikar | 395/617 |
| 5,737,523 A | 4/1998 | Callaghan et al. | 395/187.01 |
| 5,737,774 A | 4/1998 | Callison et al. | |
| 5,742,752 A | 4/1998 | DeKoning | |
| 5,754,851 A | 5/1998 | Wissner | |
| 5,761,669 A | 6/1998 | Montague et al. | 707/103 |
| 5,819,292 A | 10/1998 | Hitz et al. | 707/203 |
| 5,819,310 A | 10/1998 | Vishlitzky | 711/114 |
| 5,825,877 A | 10/1998 | Dan et al. | 380/4 |
| 5,826,102 A | 10/1998 | Escobar et al. | |
| 5,828,839 A | 10/1998 | Moncreiff | |
| 5,835,953 A | 11/1998 | Ohran | 711/162 |
| 5,854,893 A | 12/1998 | Ludwig et al. | |
| 5,854,903 A | 12/1998 | Morrison et al. | |
| 5,856,981 A | 1/1999 | Voelker | |
| 5,876,278 A * | 3/1999 | Cheng | 454/184 |
| 5,890,959 A * | 4/1999 | Pettit et al. | 454/184 |
| 5,915,087 A | 6/1999 | Hammond et al. | 395/187.01 |
| 5,931,935 A | 8/1999 | Calbrera et al. | 710/260 |
| 5,950,225 A | 9/1999 | Kleiman | |
| 5,956,491 A | 9/1999 | Marks | |
| 5,956,712 A | 9/1999 | Bennett et al. | |
| 5,957,612 A | 9/1999 | Bradley | |
| 5,963,962 A | 10/1999 | Hitz et al. | 707/202 |
| 5,983,364 A | 11/1999 | Bortcosh et al. | |
| 5,996,086 A | 11/1999 | Delaney et al. | 714/4 |
| 5,996,106 A | 11/1999 | Seyyedy | |
| 5,999,943 A | 12/1999 | Nori et al. | 707/104 |
| 6,000,039 A | 12/1999 | Tanaka et al. | |
| 6,044,214 A | 3/2000 | Kimura et al. | |
| 6,070,008 A | 5/2000 | Korenshtein | |
| 6,073,089 A | 6/2000 | Baker et al. | |
| 6,076,148 A | 6/2000 | Kedem | |
| 6,101,585 A | 8/2000 | Brown et al. | |
| H12860 | 9/2000 | Asthana et al. | |

FOREIGN PATENT DOCUMENTS

| | | | |
|---|---|---|---|
| EP | 0453193 | A2 | 4/1991 |
| EP | 0453193 | A3 | 10/1991 |
| EP | 0462917 | A3 | 12/1991 |
| EP | 0462917 | B1 | 12/1991 |
| EP | 0462917 | A2 | 12/1991 |

| | | | |
|---|---|---|---|
| EP | 0477039 A3 | 3/1992 | |
| EP | 0497067 A1 | 8/1992 | |
| EP | 0537198 B1 | 4/1993 | |
| EP | 0537098 A2 | 7/1993 | |
| EP | 0552580 A2 | 7/1993 | |
| EP | 0552580 A3 | 7/1993 | |
| EP | 0566967 A | 10/1993 | |
| EP | 0566967 A3 | 10/1993 | |
| EP | 0569313 A2 | 11/1993 | |
| EP | 0569313 | 11/1993 | |
| EP | 0629956 A3 | 12/1994 | |
| EP | 0629956 A2 | 12/1994 | |
| EP | 0747829 A1 | 12/1996 | |
| EP | 0756235 A1 | 1/1997 | |
| EP | 0760503 A1 | 3/1997 | |
| JP | 1-273395 | * 11/1989 | ................. 361/695 |
| JP | 5-29782 | * 2/1993 | ................. 361/695 |
| WO | WO 89/03086 | 4/1989 | |
| WO | WO 91/13404 | 9/1991 | |
| WO | WO 92/00834 | 1/1992 | |
| WO | WO 91/13475 | 7/1993 | |
| WO | WO 94/29795 | 12/1994 | |
| WO | WO 94/29796 | 12/1994 | |
| WO | WO 94/29807 | 12/1994 | |
| WO | WO 98/21656 | 5/1998 | |
| WO | WO 98/38576 | 9/1998 | |
| WO | WO 99/30254 | 6/1999 | |
| WO | WO 99/45456 | 9/1999 | |
| WO | WO 99/46680 | 9/1999 | |
| WO | WO 99/66401 | 12/1999 | |
| WO | WO 00/07104 | 2/2000 | |

OTHER PUBLICATIONS

Borr A J: "SecureShare: safe Unix/Windows file sharing through multiprotocol locking" Proceeding of the 2nd Usenix Windows NT Symposiom, proceedings of 2nd Usenix Windows NT Symposiom, Seattle, WA, USA, Aug., 3–5, 1998, pp. 117–126, XP002097387 ISBN 1–880446–95–2, 1998, Berkeley, CA, USA, Usenix Assoc. USA.

Tanner J:" CIFS: Common Internet File System" Unix Review, vol. 31, Feb. 1997, pp. 31/32, 34, XPOOO783952 see whole document, relevant to claim No. 1–38.

AT & T—Unix System V Release 4 Programmer's Guide: Streams, pp. 2–1 through 2–23.

AT & T Bell Laboratories Technical Journal. vol. 63 No. 08 Part 02. Dated: Oct. 1984, pp. 1876–1910.

Bach, Maurice J. et al, "The Design of the Unix Operating Systems", pp. 38–40.

Beach, Richard J., "The Message is the Medium: Multiprocess Structuring of an Interactive Paint Program", pp. 227–287.

Britton, Diane E. & Mark E. Stockel, "An Interprocess Communication Facility for Distributed Applications", IEEE. 1980. pp. 590–595.

Carlson, et al "HP AdbvanceNet: A growth–Oriented Computer Networking Architecture Strategy", Hewlett–Packard Journal, Oct. 1986, pp. 8–10.

Carr, Robert & Dan Shafer, "The Power of Penpoint", pp. 73–84.

Cashin, P.M., "Inter–Process Communication", May 1980.

Chao, Chia et al "Mime: A High performance Storage Device With Strong Recovery Guarantees", Dated: Mar. 18, 1992.

Cheriton, David R., "Multi–Process Structuring and the Thoth Operating System", 1979, pp.: 1–64.

Cheriton, David R., "The Thoth System: Multi–Process Structuring and Portability", pp. 19–21, 66–72.

Cheriton, David R. et al., "Thoth, A Portable real–Time Operating System", pp.: 105–115.

Chutani, Sailesh et al., "The Episode File System", Unix. Winter 1992, pp.: 43–60.

CIFS: Common Internet File System. UNIX Review, Feb. 1997, pp. 31,32,34,36–41.

Cohen, Jacques, "Garbage Collection of Linked Data Structures", Computing Surveys, Vol. 13, No. 03, Dated: Sep. 1981, pp. 341–367.

Computer. IEEE. Sep. 1988, pp. 233,24,25,106.

De Jonge, Wiebren et al, "The Logical Disk: A New Approach to Improving File Systems", pp.: 1–14.

Deitel, Harvey M., "An Introduction to Operating Systems", pp. 302–334.

English, Robert M. & Alexander A Stepanov, 'Loge: A Self–Organzing Disk Controller , Dec. 1991, pp.: 1–15.

Fly–By–Xor. Specification, Net–009 PCT.

Hammond, Richard A., "Experiences With A Series/1 Distributed System", pp.: 585–589.

Hanson, Per Brinch (Editor), RC 4000 Software Multiprogramming System, Apr. 1969, pp. 21–26.

Hartman, John H. & John K. Ousterhout, "The Zebra Striped Network File System".

Hewlett–Packard Journals, vol. 37. No. 10, Oct. 1986, pp. 6–10.

Hitz, David et al "Using UNIX as One Component of a Lightweight Distributed Kernal for Multiprocessor File Servers".

Hitz, David, James Lau & Michael Malcolm, "File System Design for an NFS File Server Appliance", Dated: Jan. 19, 1994.

Hitz, David, "A System Administator's Performance Monitor for Tuning NFS Network Servers", Dated: May 1991.

Hitz, David, "Technical Report TR01: An NFS File Server Appliance", Rev. A 8/93.

IBM Technical Disclosure Bulletin, vol. 36 No. 3 Mar. 1993, "Parity Preservation for Redundant Array of Independent Direct Access Storage Device Data Loss Minimization and Repair", pp. 473–478.

Jones, Anita K. et al, "StarOS, a Multiprocessor Operating System for the Support of Task Forces".

Kleiman, "Using NUMA Interconnects for a Highly Available Filers", IEEE Micro. 1999. pp.: 42–48.

Lantz, Keith A. et al, "Rochester's Intelligent Gateway", IEEE, Oct. 1982.

Leffler, Samuel J. et al., "The Design and Implementation of the 4.3 BSD UNIX Operating System", pp. 187–233, 244, 245.

Lieberman, Henry & Carl Hewitt, "A Real–Time Garbage Collector Based on the Lifetime of Objects", Communication of the ACM, vol. 26. No. 06. Dated: Jun. 1983.

Malcolm, Michael A. "A Process and Its Application", Dated: 1978.

Montoye R.K. et al., Microprocessors Session 3 WPM 3.4 "An 18ns 56–Bit Multiply–Adder Circuit", IEEE. Feb. 14, 1990, pp. 46,47,262.

Motorola, inc., "Microsystems Products Technical Data Sheet (1986), MicroMAP 1–7, MicroMAP Manufacturing Automation Protocol Software".

Nass, Richard "Connect Disk Addays to EISA or PCI Buses", *Electronic Design*, Nov. 11, 1993.

Nelson, Bruce & Yu–Ping Cheng, "The Myth of transfer Rate–How and Why SCSI is Better than IPI for NFS", Dated: Jul. 1992.

Nelson, Bruce et al., "The Myth of MIPS for I/O–An Overview of Functional Multiprocessing for NFS Network Servers", Dated: Aug. 1992.

Nelson, Bruce, "Benchmark Methodology and Preliminary Performance Specifications for the Auspex NS 5000 Network Server", Dated: Oct. 1989.

Network Appliance–Data ONTAP Event Management System, Aug. 10, 2000.

Network Interfaces Programmer's Guide, Sun Microsystems, Inc. 1992.

Optical Backplanes Driven by Sebring Rings Can Supply 40–160 Terabits/Sec of Wire–Speed Routing by 2002.

Optipat Document Delivery, Feb. 2, 2002, pp.: 02.

Osadzinski, Alex, "The Network File System (NFS)".

Ousterhout, John & Fred Douglas, "Beating the I/O Bottleneck: A Case for the Log–Structured File Systems".

Patterson, David A. et al., "A Case for Redundant Arrays of Inexpensive Disks (RAID)".

Plum, Thomas, "Reliable Data Structures In C", pp. 4–23 through 4–27.

Rashid, Richard F. et al., "Accent: A Communication Oriented Network Operating System Kernal".

Robertazzi, Thomas G. Computing Networks and Systems: Queueing Theory and performance Evaluation.

Row, John & DVID Daughery, "Operating System Extensions Link Disparatee Systems", *Computer Design*, Dated: Jul. 1984.

Row, John, "Lan Software Links Diverse Mamchines", OS's *Mini–Micro Systems*, Dated: Sep. 1985.

Sandberg, Russel, "The SUN Network File System: Design, Implementation and Experience".

Schroeder W., "Peace: The Distributed SUPRENUM Operating System".

Schwartz, Allan M., David Hitz, & William M. Pitts, "LFS–A Local File System for Multiprocessor NFS Network Servers", Dated: Dec. 1989.

Sebring Rings in Networking, Aug. 9, 1999.

Sebring Theory of Ring Operation (STROP), Sep. 9, 1999.

Seltzer, Margo Ilene, File System Performance and Transaction Support, 1992.

Session, Roger Class Construction in C and C++ Object–Oriented Programming Fundamentals, 1992, pp. 95–102.

Silberschatz, Abraham & James L. Peterson, *Operating System Concepts*,1989, pp. 127–147.

Sicoskie, W. David & David J. Farber, The Series/1 Distributed Operating System: Description and Comments.

"SRC 6466 External Architecture Specification", Rev. 0.7, May 5, 1999.

"SRC 6466 Protocol Specification", Rev. 0.9 Draft, Aug. 16, 1999.

Srinivasan, B., "Recoverable File System for Microprocessing Systems Microprocessors and Microsystems".

Stallings, William, *5th Edition–Data and Computer Communicatons*, 1997, pp. 324–333.

Stern, Hal, "Managing NFS and NIS", O'Reilly & Associates, Inc. 1991, pp. 124,125.

Tan, See–Mong, Harvard Holmes, & Craig Eades. SOS–Stan's Own Server–A NFS File Server for the IBM PC.

Tanenbaum, Andrew S., "Computer Networks", 2nd Edition, pp. 35,36.

Tanenbaum, Andrew S, *Operating Systems–Design and Implementation*, 1987, pp. 251–273.

Tribby, David M., "Network Services for HP Real–Time Computers", Hewlett–Packard Journal. Oct. 1996.

"TUX 2: Slashdot.com TUX 2: The FileSystem That Would Be King", Dated: Oct. 17.

Tweten, David, "Hiding Mass Storage Under UNIX: NASA's MSS–II Architecture," IEEE. 1990.

"UI–Atlas–Distributed Computing Architecture: A Technical Overview", Oct. 1991.

USENIX Association, "Proceedings of the Winter 1992 USENIX Conference", San Francisco, CA. Jan. 20–24, 1992, pp. 43–60.

"VRTX C User's Guide", Jan. 1987, pp. 1–8, 3–7 through 3–9.

"VRTX32/68020 Versatile Real–Time Executive for the MC68020 Microprocessor", Dated: Apr. 1987, pp. 2–20.

Walton, Robert L "Rationale for a Queueable Object Distributed Interprocess Communication System", IEEE. 1992.

Wood, B.J. et al., "A Local–Area Network Arhcitecture Based on message–Passing Opeating System Concepts".

* cited by examiner

LAMINAR FLOW DUCT COOLING SYSTEM

FIELD OF THE INVENTION

This invention relates to noise reduced computer fan cooling systems.

BACKGROUND OF THE INVENTION

Personal computers and generic boxes housing electronic components are conventionally cooled by fans mounted to their back panels that blow air across their respective components and transfer heat through convection.

The design trend towards smaller enclosures packing more computing power in less space has increased the amount of heat generated per unit area and consequently has required more effective and reliable cooling. Failure to provide adequate cooling can result in electronic component or peripheral failure, the loss of valuable computing time, and wasted resources in recovering lost data. It is therefore more cost efficient to provide a given box with the requisite cooling initially than to repair and retrofit. However, it is also important to provide cooling without introducing acoustic noise that could diminish system efficiency. System acoustic noise generally takes two forms: mechanical noise and aerodynamic noise.

Mechanical noise is generated from the vibration of moving parts such as fans and disk drives. Aerodynamic noise is generated from turbulent airflow across and in the vicinity of the fan blades. The design and implementation of grommets or other dampening devices for minimizing mechanical noise is well known in the art. Techniques of minimizing aerodynamic noise are less well known. However, while less well known and less critical than the techniques for minimizing mechanical noise they are still important for optimizing system efficiency.

In general, aerodynamic noise generated by cooling fans is a function of the type of flow in the region surrounding the fan blades, flow velocity, fan blade shape, number of fan blades and the shape of the duct in which the fan is housed.

Many different approaches have been tried to minimize cooling fan noise. These approaches try to minimize noise contributions by modifying at least one of the aforementioned parameters. However, a first problem known in the art is that changing flow velocity and type of flow can result in less cooling and it would be desirable to change flow characteristics to minimize noise without diminishing cooling capacity.

It is known in the art to provide a grille at an airflow entrance for the fan both for human safety and for minimizing radiated electromagnetic noise. A second problem known in the art is that an airflow grille with grill openings small enough to minimize both radiated electromagnetic noise and human contact with rotating fan blades can decrease the efficiency of the fan. This efficiency decrease can result from at least two factors. (1) The airflow grille produces back-pressure on the fan, so that operation of the fan is strained and the fan can be subject to extra wear. (2) The airflow grille produces turbulence, so that operation of the fan is less efficient and airflow over the systems or equipment is less efficient at cooling.

Accordingly, it would be advantageous to provide a cooling system and a method for operating a cooling system, which has relatively reduced noise and is relatively efficient and inexpensive. This advantage is achieved in an embodiment of the invention in which a laminar flow duct modifies flow characteristics by separating a set of cooling fans from an airflow grille. Thus, back pressure on the fan is reduced and laminar flow through the fan and over the systems or equipment is improved.

SUMMARY OF THE INVENTION

The invention provides a cooling system and a method for operating a cooling system, which has relatively reduced noise and is relatively efficient and inexpensive. A set of cooling fans operates in conjunction with an airflow grille and a laminar flow duct, so as to reduce the amount of aerodynamic noise, and to block dust and other foreign objects. A laminar flow duct separates the cooling fans from the airflow grille, so as to reduce back pressure on the fan and improve laminar flow through the fan and over the systems or equipment. Additionally, the laminar flow duct acts to reduce electromagnetic noise.

In a preferred embodiment, the laminar flow duct defines a Venturi opening, so as to draw airflow into the cooling fans from a region adjacent to the laminar flow duct. The Venturi opening allows the cooling fans to cool a secondary set of systems or equipment, such as a set of disk drives or other equipment that need relatively minimal cooling effect.

DETAILED DESCRIPTION OF THE PREFERRED EMBODIMENT

In the following description, a preferred embodiment of the invention is described with regard to preferred process steps and geometries. Those skilled in the art would recognize after perusal of this application that embodiments of the invention can be implemented using cooling systems adapted to particular process steps and geometries described herein, and that implementation of the process steps and geometries described herein would not require undue experimentation or further invention.

System Elements

Figure 1:
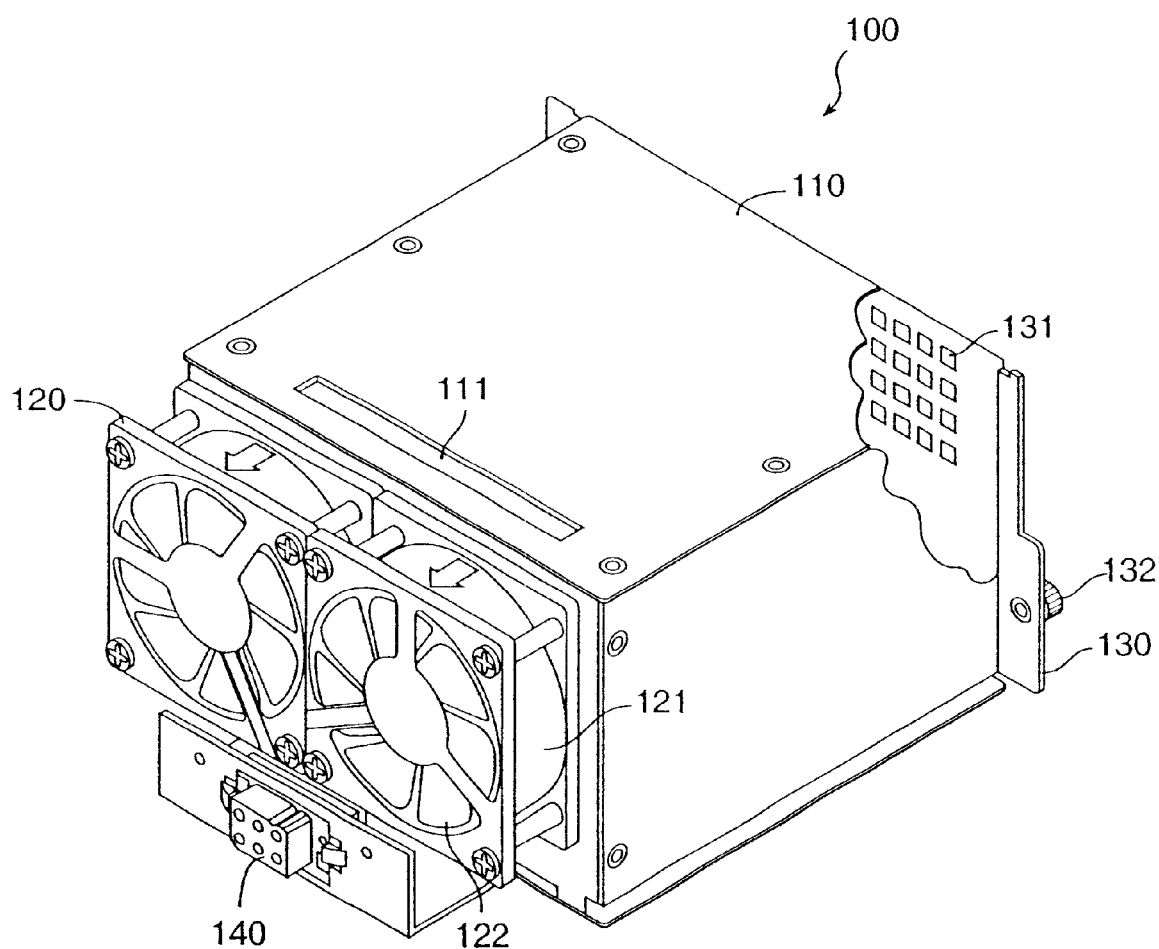
FIG. 1 shows an isometric view of a laminar flow duct cooling system with a Venturi opening and a breakaway view of an airflow grille.

FIG. 1 shows an isometric view of a laminar flow duct with a Venturi opening. A cooling system 100 includes a plenum or laminar flow duct 110 including a Venturi opening 111 and a set of cooling fans 121 each encased in a fan housing 120 with each fan including a fan toroidal opening 122. Additionally, FIG. 1 shows a blind mate connection 140 and in a breakaway view an airflow grille 130 including grille opening pattern 131 and thumb screws 132. The plenum or laminar flow duct 110 may be any geometry that defines an interior cavity through which air may be conducted via fan power. For example, possible geometries may include rectangular solids, cylindrical solids, or the like. Furthermore, the Venturi opening 111 may assume any geometry so long as the flow proximate to the set of cooling fans 121 remains laminar flow. Thus, possible geometries may include a rectangular slot, an elliptical slot, an array of slots or holes, or the like. Additionally, the geometries of the openings in the grille opening pattern 131 may include any of variety of shapes. Possible geometries may include square, rectangular, triangular, circular or elliptical shapes.

Method of Operation

Figure 2:
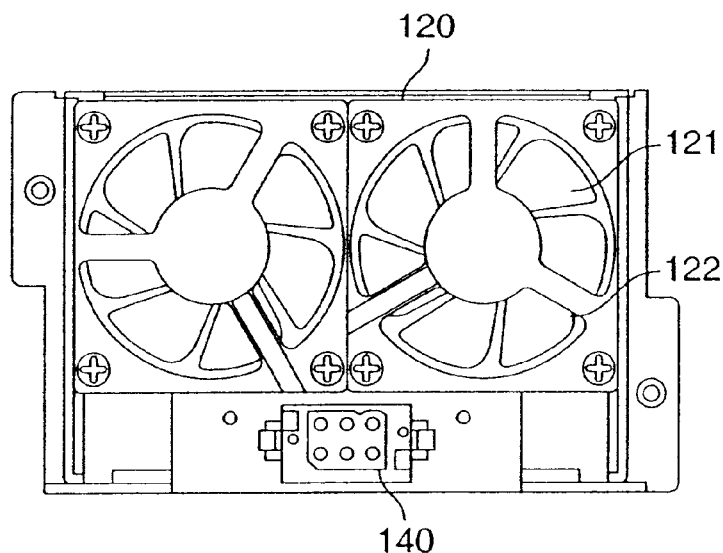
FIG. 2 shows a front view of a laminar flow duct with set of cooling fans attached.

In a preferred embodiment the laminar flow duct 110 is a rectangular solid, 3 to 5 inches in length, and defines an anterior end and a posterior end. FIG. 2 shows a front view of a rectangular shaped laminar flow duct with a set of cooling fans 121 attached to its posterio end. Additionally, FIG. 2 shows blind mate connection 140 which acts as a conduit for power and control signals for the set of cooling fans 121.

Figure 3:
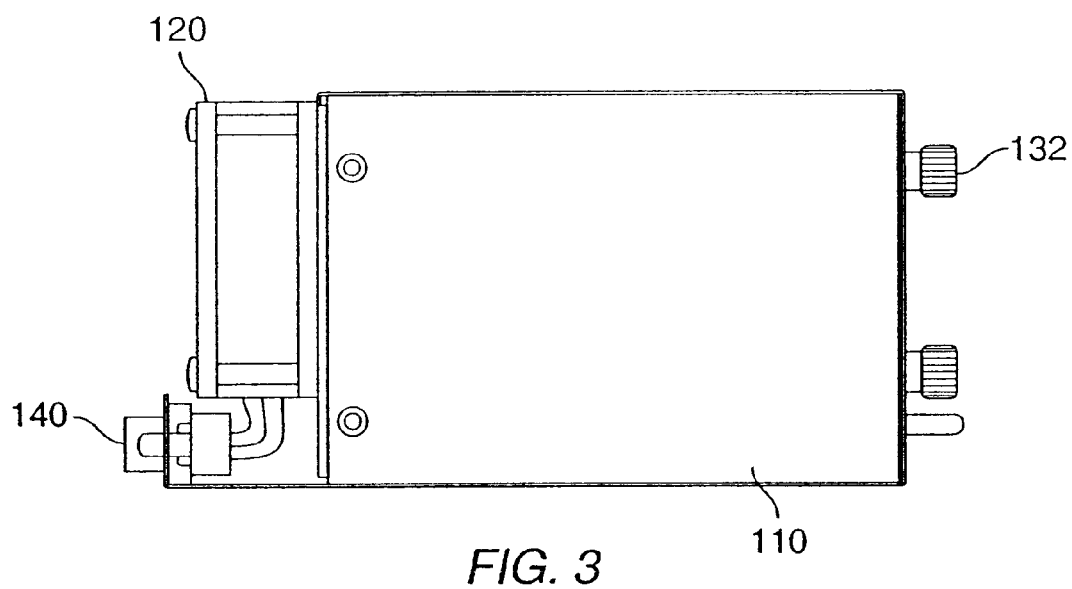
FIG. 3 shows a right side view of a laminar flow duct with set of cooling fans attached.

As shown in FIG. 3, the airflow grille is connected to the anterior end of the laminar flow duct 110, while the set of cooling fans are connected to the posterior end. The set of cooling fans 121 are disposed to receive incoming air which is channeled through the grille opening pattern 131 and sucked through the laminar flow duct 110 and through the Venturi opening 111 and blown to a region requiring cooling.

The breakaway view in FIG. 1 shows a view of a laminar flow duct 110 with integral airflow grille 130 having grille opening pattern 131. In a preferred embodiment airflow grille 130 is perforated sheet metal, grille opening pattern 131 has openings of rectangular shape and Venturi opening 111 is rectangular in shape. As air is sucked through the airflow grille 130 and plenum or laminar flow duct 110 it creates an area of low pressure at the Venturi opening 111 which in turn sucks air down through the Venturi opening 111, into the laminar flow duct 110 and through the set of cooling fans 121 where it is blown to a region requiring cooling. Additionally, as air is sucked down through the Venturi opening 111 in a Venturi downdraft, an air stream parallel to that flowing through the laminar flow duct is created upstream from the Venturi opening 111 in the region above the section of the laminar flow duct 110 which contains the Venturi opening 111. In a preferred embodiment the Venturi downdraft is 150 lfm.

This provides cooling not only in the region downstream from the set of cooling fans 121 but also in the region of the laminar flow duct 110 upstream from the Venturi opening 111. The presence of two air streams, one at the output of the set of cooling fans 121 and one along the region of the laminar flow duct containing the Venturi opening 111 is advantageous in that components can be cooled both downstream and upstream from the set of cooling fans thus lending flexibility to component placement and box design. For example, in a preferred embodiment, a disk drive or other component that does not require a high flow rate for cooling may be placed in the air stream created by the Venturi downdraft.

The design of the cooling system 100 is such that the set of cooling fans 121 are redundant and only one is necessary to cool a given personal computer or electronic box. However, the presence of the additional fan decreases the load on the individual fans and thereby increases fan efficiency and fan life. Moreover, it adds redundancy to the cooling mechanism, when desired, so immediate attention is not needed in the case of any one fan failure.

Laminar flow duct 110 in addition to conducting the laminar flow air stream from the airflow grille 130 to the set of cooling fans 121 acts as a RF collimator and reduces emission spread. That is it acts to minimize EM noise. Similarly, the small grille opening pattern 131 wherein the size of the opening is small in comparison to the wavelength of the radiated EM noise provides better rejection of RF noise emission.

The length of the laminar flow duct 110 allows the incoming air to transition from turbulent flow to laminar flow. In addition, maintaining an overall grille opening pattern 131 area that is greater than or equal to the fan toroidal opening 122 contributes to laminar flow within the laminar flow duct 110 proximate to the set of cooling fans 121 and lengthens the zone of laminar flow from the zone proximate to the set of cooling fans 121 to the region proximate to the airflow grille 130. The increased area of the grille opening pattern 131 also restricts airflow less than conventional airflow grilles and hence decreases back pressure thereby minimizing both fan bearing and motor stress and their concomitant mechanical noise.

ALTERNATIVE EMBODIMENTS

Although preferred embodiments are disclosed herein, many variations are possible which remain within the concept, scope, and spirit of the invention, and these variations would become clear to those skilled in the art after perusal of this application.

We claim:

1. A cooling system which reduces aerodynamic and electromagnetic noise comprising:

one or more cooling fans in a housing, each fan having a toroidal fan opening and disposed for providing positive airflow over a first planar region, along a first linear axis substantially parallel to the first planar region;

an airflow grille, defining a second planar region substantially perpendicular to said first linear axis, said airflow grille defining a set of through-holes substantially parallel to said first linear axis wherein said grille opening is equal to or greater than said toroidal fan opening such that aerodynamic and electromagnetic noise are minimized; and a first laminar flow region disposed between said cooling fans and said airflow grille, said first laminar flow region defined by a laminar flow duct wherein said laminar flow duct has a geometry of a rectangular solid such that said laminar flow duct defines a Venturi opening, said Venturi opening being operative in conjunction with said one or more cooling fans to provide airflow through said Venturi opening from a region both upstream and above a region of said laminar flow duct containing said Venturi opening wherein airflow is parallel to said first laminar flow region, said laminar flow duct being coupled on a first end to a housing for said one or more cooling fans and on a second end to said airflow grille, and said laminar flow duct being substantially parallel to said first linear axis, wherein said laminar flow duct acts as an RF collimator to reduce electromagnetic noise.

2. A method for cooling electronics and minimizing aerodynamic and electromagnetic noise, including steps for:

cooling incoming air with one or more cooling fans in a housing, disposed for providing positive airflow over a first planar region, along a first linear axis substantially parallel to the first planar region;

receiving air through an airflow grille which defines a second planar region substantially perpendicular to said first linear axis, said airflow grille defining a set of through-holes substantially parallel to said first linear axis; and receiving air through a first laminar flow region disposed between said cooling fans and said airflow grille, said first laminar flow region defined by a laminar flow duct, said laminar flow duct being coupled on a first end to a housing for said one or more cooling fans and on a second end to said airflow grille, and said laminar flow duct being substantially parallel to said first linear axis.

3. A method for cooling electronics and minimizing aerodynamic and electromagnetic noise, including steps for:

cooling incoming air with one or more cooling fans in a housing, each fan having a toroidal fan opening and disposed for providing positive airflow over a first planar region, along a first linear axis substantially parallel to the first planar region;

receiving air through an airflow grille which defines a second planar region substantially perpendicular to said first linear axis, said airflow grille defining a set of through-holes substantially parallel to said first linear axis wherein said grille opening is equal to or greater than said toroidal fan opening such that aerodynamic and electromagnetic noise are minimized; and receiving air through a first laminar flow region disposed between said cooling fans and said airflow grille, said first laminar flow region defined by a laminar flow duct wherein said laminar flow duct has a geometry of a rectangular solid such that said laminar flow duct defines a Venturi opening, said Venturi opening being operative in conjunction with said one or more cooling fans to provide airflow through said Venturi opening from a region both upstream and above a region of said laminar flow duct containing said Venturi opening wherein airflow is parallel to said first laminar flow region, said laminar flow duct being coupled on a first end to a housing for said one or more cooling fans and on a second end to said airflow grille, and said laminar flow duct being substantially parallel to said first linear axis wherein said laminar flow duct acts as an RF collimator to reduce electromagnetic noise.

* * * * *